United States Patent [19]
Pasin et al.

[11] Patent Number: 5,499,834
[45] Date of Patent: Mar. 19, 1996

[54] TRICYCLE

[75] Inventors: Mark Pasin, Oak Park; Roger Tonelli, Elmwood Park, both of Ill.; James B. Easley, Minneapolis, Minn.

[73] Assignee: Radio Flyer Inc., Chicago, Ill.

[21] Appl. No.: 324,176

[22] Filed: Oct. 14, 1994

[51] Int. Cl.⁶ .................................................. B60B 37/00
[52] U.S. Cl. .......................... 280/282; 280/259; 301/2.5; 301/110.5; 74/594.1; D12/112
[58] Field of Search ................................ 280/282, 288.3, 280/281.1, 259, 828, 829, 1.12, 1.13, 62; 301/2.5, 110.5, 105.1; 74/594.1, 594.4; D12/112, 113, 115, 123; 446/440, 448

[56] References Cited

U.S. PATENT DOCUMENTS

| | | | |
|---|---|---|---|
| D. 178,979 | 10/1956 | Wintermantel | D12/112 |
| D. 226,441 | 3/1973 | Schreckengost | D12/113 |
| 2,202,479 | 6/1937 | Bullock | 280/282 |
| 2,944,833 | 7/1960 | Wintermantel et al. | 280/282 |
| 4,657,270 | 4/1987 | Allen et al. | 280/282 X |
| 5,236,248 | 8/1993 | Chen | 301/110.5 X |

FOREIGN PATENT DOCUMENTS

| | | | |
|---|---|---|---|
| 0493684 | 5/1954 | Italy | 74/594.1 |
| 1493532 | 7/1989 | U.S.S.R. | 280/281.1 |

*Primary Examiner*—Margaret A. Focarino
*Assistant Examiner*—Victor E. Johnson
*Attorney, Agent, or Firm*—James P. Ryther

[57] ABSTRACT

A child's tricycle comprising a pair of rear wheels, a front wheel, a seat positioned between the front and rear wheels, a support for the seat extending between the front and rear wheels, a handle for steering, and a steering fork having an upper end for supporting the handle and a bifurcated lower end for supporting the front wheel. A one-piece crank extends through the front wheel and defines outer ends disposed on opposite sides of the front wheel for holding pedals whereby a child can propel the tricycle by applying foot pressure to the pedals to thereby turn the crank and associated front wheel. A driving connection between the crank and front wheel is provided by a centrally located bend in the crank, and a centrally located opening defined by the front wheel snugly receiving the bend. A head tube is eliminated by using a steering fork and steering wheel telescoping combination which extends through vertically-aligned openings in the tubular support extending longitudinally of the tricycle. The rear step is formed by a tubular housing which includes end plugs supporting rear axle bearings while also having flanges serving as a safety barrier between the step and adjacent rear wheels.

4 Claims, 4 Drawing Sheets

5,499,834

TRICYCLE

BACKGROUND OF THE INVENTION

This invention relates to a child's tricycle. In particular, the invention involves a unique design for a tricycle which achieves a highly marketable product incorporating certain features rendering the product especially suitable for efficient manufacturing.

Traditional designs of tricycles for children have included a pair of rear wheels, a single front wheel, and an interconnecting frame. The frame supports handlebars positioned over the front wheel, a child's seat, and usually a rear step which permits use without the child being seated, i.e., use with one foot on the step and the other propelling the tricycle. When the child is seated, the tricycle is propelled by means of pedals attached to the front wheel.

Among various reasons for seeking variations from traditional designs is the fact that a tricycle must have market appeal so that parents and children will be satisfied with the product. Accordingly, adopting new structural features which have customer appeal is desirable.

In a highly competitive market, it is also desirable to adopt structural features which lower manufacturing costs either from the standpoint of materials used, with respect to the cost of parts, and/or with respect to assembly efficiencies. Where such manufacturing advantages can be achieved while at the same time improving the appeal of a product from a marketing point of view, then a particularly desirable combination is realized.

SUMMARY OF THE INVENTION

The child's tricycle of this invention is conventional from the standpoint of the front and rear wheels, the interconnecting frame, and the handlebars, pedals, seat and rear step. Improvements are found, however, in the form of the frame, in the driving connection of the pedals with the front wheel, and in the rear step. In addition, the combination achieves a tricycle which is especially desirable both from a marketing and manufacturing point of view.

The frame of the invention essentially consists of a single tubular member which is attached to the rear step at one end and which has an opposite or outer end extending to a position over the front wheel. In addition to supporting the child's seat, this tubular member defines an opening in the outer end which receives the handle bar support. This design eliminates the head tube typically used for containing the handlebar support resulting in a highly cost-efficient arrangement with a unique look.

The handle bar support comprises a steering fork portion extending to the front wheel. The wheel is driven by means of a crank which extends through the lower ends of the fork and through the front wheel. A driving connection between the front wheel and the crank is achieved by means of a bend formed centrally of the crank. A receiving opening is formed in the front wheel for snugly confining this bent portion of the crank. Again, a highly cost-efficient combination is achieved.

The rear step of the tricycle of this invention is in the form of an enclosed housing with an upper supporting surface. The opposite ends of the housing are open and are dimensioned to receive respective plugs which close off the housing interior. In addition, these plugs are adapted to carry bearings which support the axle for the rear wheels. A unique design is thereby achieved along with a further cost-efficient combination.

DESCRIPTION OF THE PREFERRED EMBODIMENTS

Figure 1:
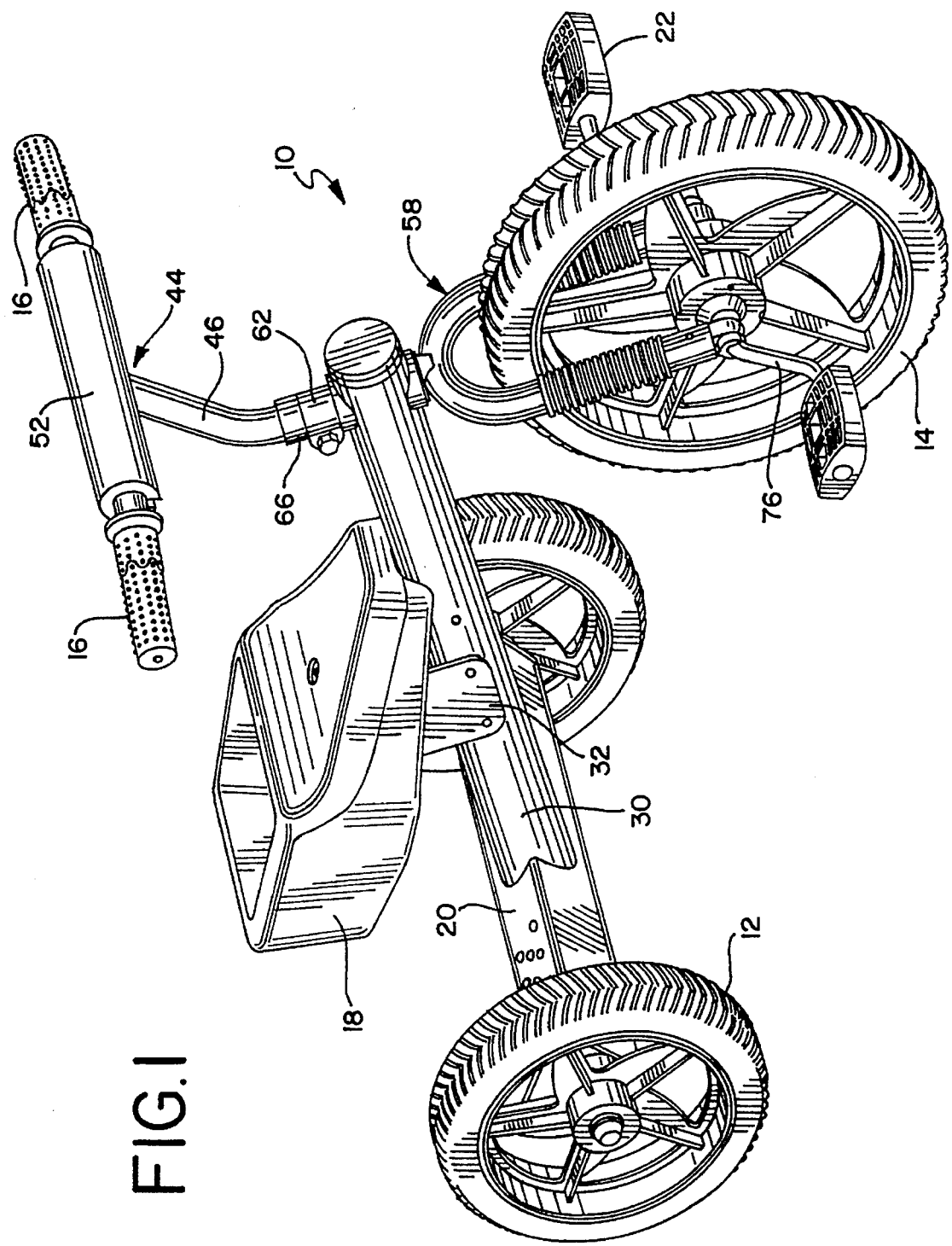
FIG. 1 is a perspective view of a tricycle incorporating the features of this invention.
Figure 2:
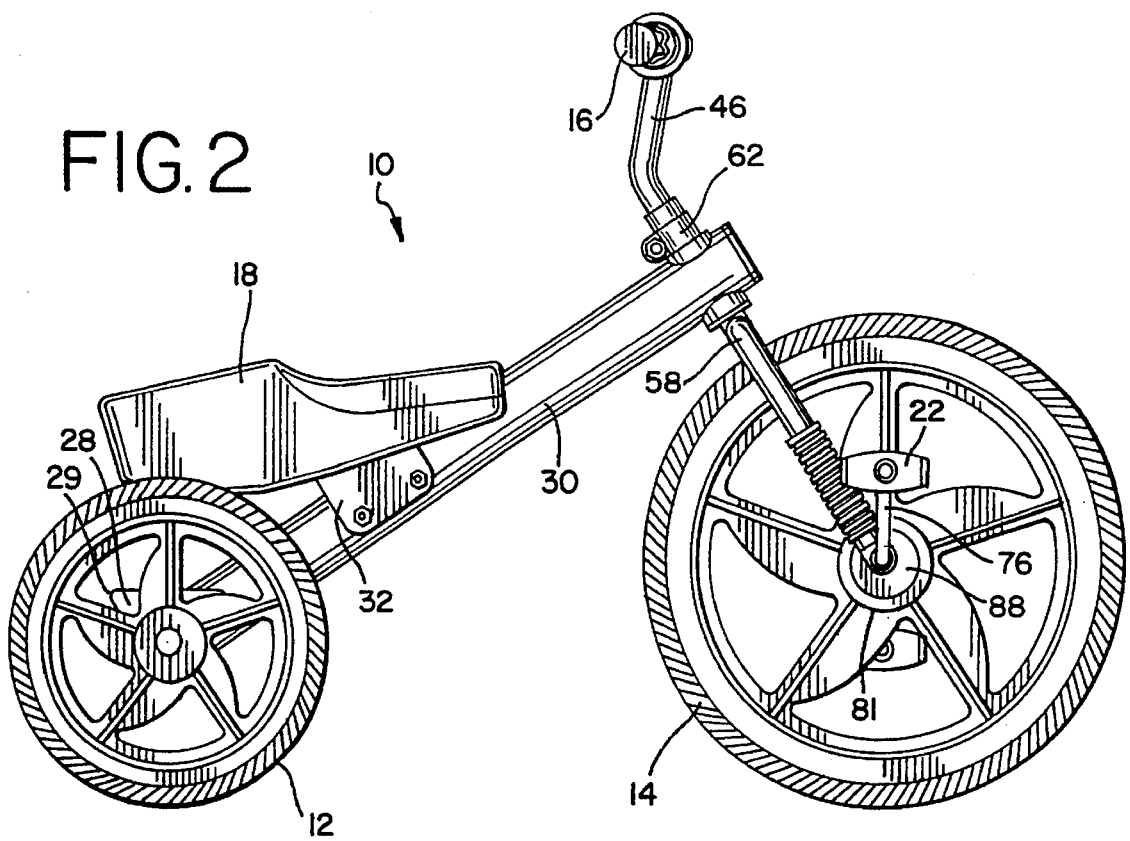
FIG. 2 is a side elevational view of the tricycle.
Figure 3:
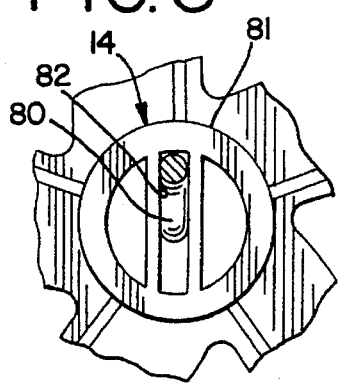
FIG. 3 is a cross-sectional, fragmentary view illustrating the interconnection of the pedal crank and front wheel of the tricycle.

FIGS. 1–4 illustrate tricycle 10 and various components thereof. The latter include rear wheels 12, front wheel 14, steering handle grips 16, seat 18 and rear step 20. The tricycle may be propelled by a child sitting on seat 18 and pushing pedals 22, or the child may place one foot on the rear step and, while holding the handles, propel the tricycle with the other foot.

The rear step 20 takes the form of a tube which is triangular in cross section. Each rear wheel is mounted at the end of axle 24 and this axle extends within the interior 26 of the step housing. A pair of end plugs 28 are provided for closing off the open ends of the step housing.

Figure 6:
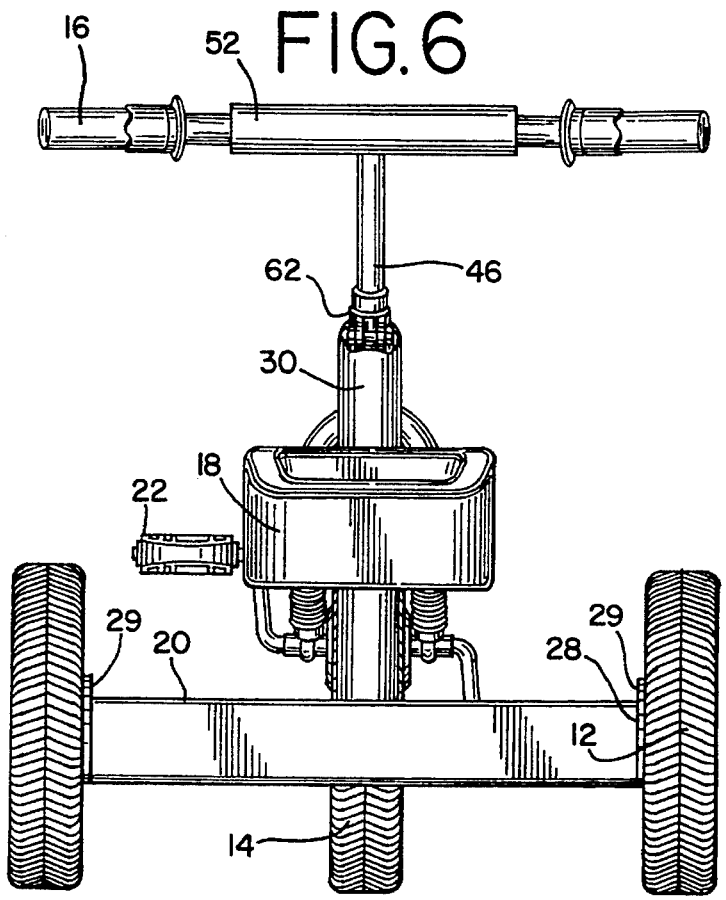

In the preferred form of the invention, the plugs 28 define internal bores supporting the axle 24, and a relatively tough plastic material, such as high density polyethylene, is preferably used. The plugs 28 also include an upwardly extending flange 29 best shown in FIG. 6. These flanges protect against the child's foot from sliding into contact with a wheel. Accordingly, the plugs 28 have plural functions since they provide a neat appearance for the step, keep debris from entering the step housing, serve as bearings, and serve a safety function. These functions are all achieved with simple assembly operations.

Tubular support member 30 extends upwardly from the step 20. Seat 18 is positioned on bracket 32, and fasteners 38, 40 hold the seat and bracket in assembly. Fasteners 34, 36 secure the bracket and seat assembly to the support member 30. A cap 54 is press fit into the end of support member 30 for closing off the outer end of the support.

Handle support 44 includes a stem portion 46 and the horizontal portion 48 of the handle support has the grips 16 located thereon. The portion 48 also supports protective padding 50 and associated cover material 52.

Figure 5:
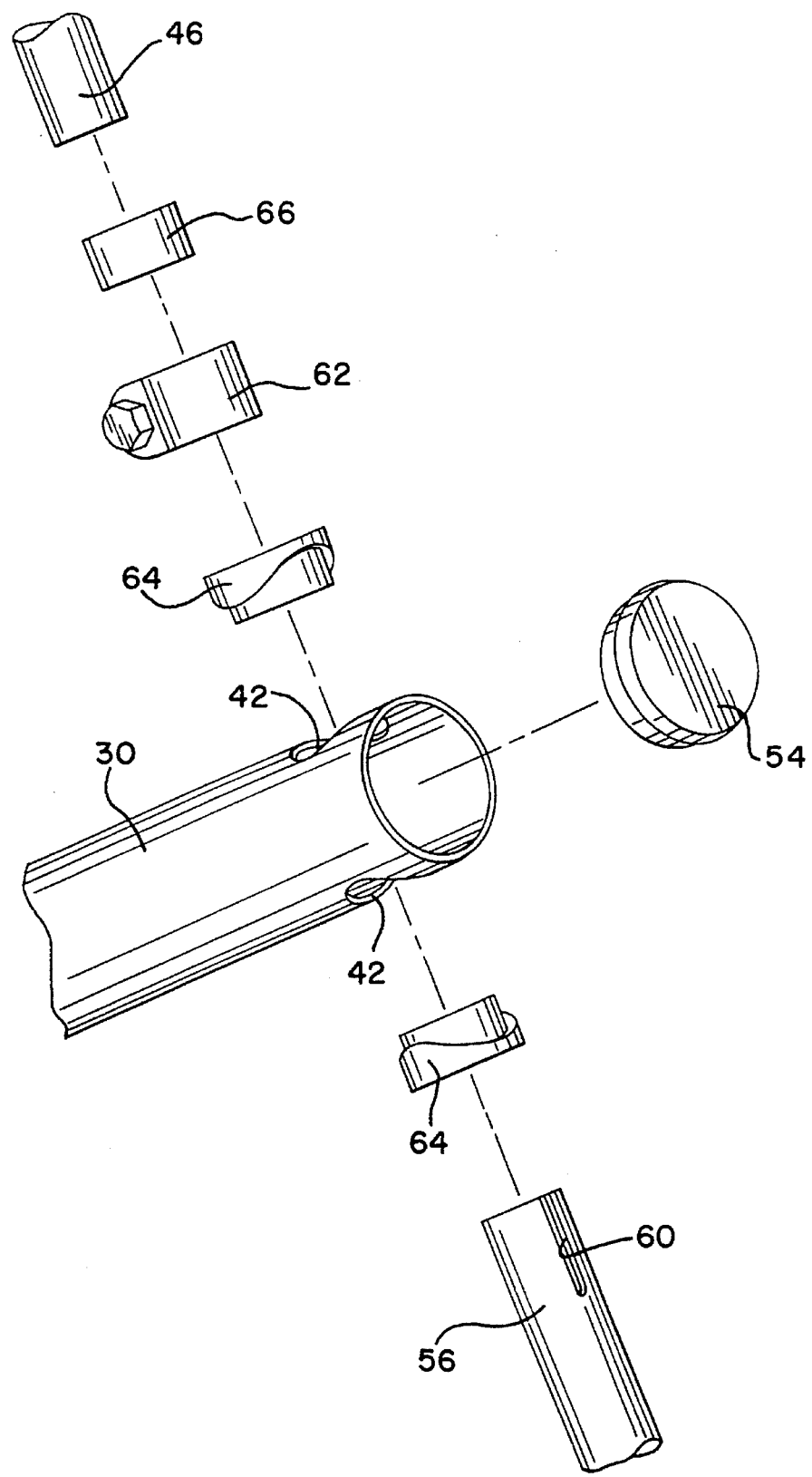
FIG. 5 is an enlarged exploded view illustrating the frame and steering fork components of the invention; and, FIG. 6 is a rear elevational view of the tricycle.

The outer end of the support 30 defines vertically aligned openings 42. The stem portion 46 of the handle support is telescopically receivable within the tubular end 56 of the fork element 58 and, as best shown in FIG. 5, this tubular end defines a slot 60. The openings 42 are dimensioned to receive this tubular end and the tubular end is dimensioned to receive the stem portion 46. A clamp 62 is fitted around the end 56 after the stem portion is inserted and, when the clamp is tightened, these parts are held in secure assembly.

High density polyethylene or other plastic ring elements 64 are press fit into the openings 42 to provide bearings for the end 56 of the fork element 58. Additional soft vinyl ring 66 may be pushed into place above clamp 62 to improve the appearance and also to provide a soft engaging surface for a child's hand.

The ends 68 of fork element 58 extend on each side of front wheel 14. Each end receives a bearing assembly 70 which is held in place by means of fasteners 72, 74. A crank member 76 includes an intermediate section comprising outer portions 78 which are received by the bearings.

Figure 4:
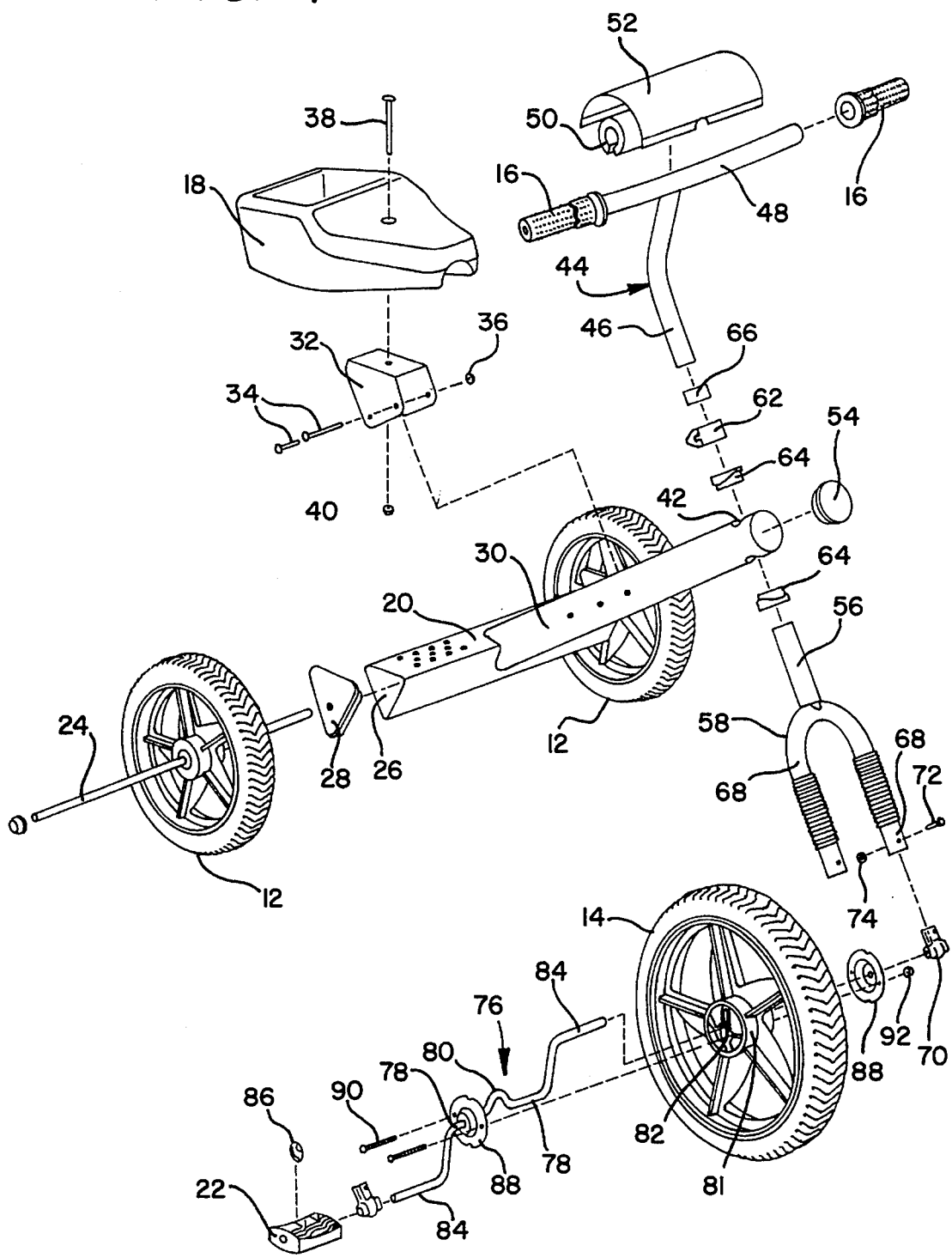
FIG. 4 is an exploded view of the components of the tricycle of this invention.

Intermediate the portions 78 the crank member includes bent portion 80. Front wheel 14 includes hub 81 which defines passageway 82 which is rectangular in shape and which snugly receives the bent portion 80 as best shown in FIG. 4. The crank member also includes outer ends 84 which have pedals 22 secured thereto by means of caps 86. Larger caps 88 are secured to the wheel hub by means of fasteners 90, 92.

It will be appreciated that when a child operates the tricycle by pushing on pedals 22, the bend 80 in crank 76 provides a driving connection to the wheel 14 through hub 81. This connection is most reliable and is achieved in a very economical fashion since the crank 76 can be formed from a metal rod and the hub 14 can be readily molded from plastic, materials commonly used in the manufacture of children's toys. Furthermore, these components are easily assembled and are therefore cost-effective for this additional reason.

It will be understood that the various changes and modifications may be made in the subject matter of this invention without departing form the spirit thereof particularly as defined in the following claims.

That which is claimed is:

1. A child's tricycle comprising a pair of rear wheels, a front wheel, a seat positioned between the front and rear wheels, a support for said seat extending between said front and rear wheels, a handle for steering, a steering fork having an upper end for supporting said handle and a bifurcated lower end for supporting said front wheel, said front wheel defining radially extending portions and a rim portion for supporting a tire, and a centrally located opening defined by said front wheel and formed integrally with said radially extending portions, a one-piece crank extending through said opening, said crank having an axis aligned with the axis of the front wheel and defining outer ends disposed on opposite sides of said front wheel, pedals attached to said outer ends whereby a child can propel the tricycle by applying foot pressure to the pedals to thereby turn the crank and associated front wheel, and a driving connection between said crank and front wheel comprising a centrally located bend in said crank, said bend being received within said opening, said bend comprising a first portion of the crank extending outwardly away from the axis of the crank and a second portion of the crank extending inwardly to the axis of the crank, said first and second portions lying in a plane including said axis, said centrally located opening being substantially rectangular with the long dimension thereof formed parallel to said plane and being sufficiently large for receiving said first and second portions, and the short dimension thereof being substantially equal to the diameter of said crank whereby said bend of said crank is snugly received within said centrally located opening.

2. A tricycle according to claim 1 including covers attached to said front wheel on opposite sides of said opening, and bearings attached to said bifurcated lower end of said fork and positioned outside the respective covers, said bearings supporting said crank.

3. A tricycle according to claim 1 including a tubular member extending from said rear wheels and having an outer end positioned over said front wheel, a first opening formed in the top surface of said tubular member and a second opening vertically aligned with said first opening formed in the bottom surface of said tubular member, bearings received in said respective vertically aligned first and second openings, the portion of said fork supporting said front wheel comprising a tubular portion extending upwardly from said bifurcated lower end and receivable within each of said bearings, the portion of said fork supporting said handle comprising a downwardly extending portion receivable within said upwardly extending tubular fork portion, and means for clamping said tubular fork portion around said downwardly extending fork portion whereby said fork portions are tied together for turning of said front wheel by means of said handle.

4. A tricycle according to claim 3 wherein said outer end portion of said tubular member is open, and an end cap inserted into said open end portion.

* * * * *